United States Patent
Pu et al.

(10) Patent No.: US 10,920,123 B2
(45) Date of Patent: Feb. 16, 2021

(54) THERMOSENSITIVE SELF-PLUGGING BENTONITE AND PREPARATION METHOD THEREOF AND WATER-BASED DRILLING FLUID

(71) Applicant: Southwest Petroleum University, Chengdu (CN)

(72) Inventors: Xiaolin Pu, Chengdu (CN); Wenxin Dong, Chengdu (CN)

(73) Assignee: SOUTHWEST PETROLEUM UNIVERSITY, Chendu (CN)

( * ) Notice: Subject to any disclaimer, the term of this patent is extended or adjusted under 35 U.S.C. 154(b) by 0 days.

(21) Appl. No.: 16/808,038

(22) Filed: Mar. 3, 2020

(65) Prior Publication Data
US 2020/0283673 A1    Sep. 10, 2020

(30) Foreign Application Priority Data

Mar. 6, 2019   (CN) .......................... 201910167197.0

(51) Int. Cl.
| | |
|---|---|
| *C09K 8/24* | (2006.01) |
| *C08F 20/56* | (2006.01) |
| *C09K 8/20* | (2006.01) |
| *C08K 3/34* | (2006.01) |

(52) U.S. Cl.
CPC ................ *C09K 8/24* (2013.01); *C08F 20/56* (2013.01); *C08K 3/346* (2013.01); *C09K 8/20* (2013.01)

(58) Field of Classification Search
CPC . C09K 8/62; C09K 8/80; C09K 8/805; C09K 19/38; C09K 2208/08; C09K 2208/10; C09K 8/035; C09K 8/12; C09K 8/145; C09K 8/206; C09K 8/24; C09K 8/508; C09K 8/516; C09K 8/588; C09K 8/594; E21B 43/267; E21B 43/166; E21B 43/20
See application file for complete search history.

(56) References Cited

U.S. PATENT DOCUMENTS

| | | | | |
|---|---|---|---|---|
| 2,442,120 | A | * 5/1948 | Duke ..................... | C09K 8/145 |
| | | | | 423/170 |
| 2001/0049413 | A1 | * 12/2001 | Haraguchi ............... | C08J 3/075 |
| | | | | 524/446 |
| 2008/0045420 | A1 | * 2/2008 | Karagianni ............ | C09K 8/035 |
| | | | | 507/121 |

FOREIGN PATENT DOCUMENTS

| | | | |
|---|---|---|---|
| CN | 109233761 | * | 1/2019 |
| EP | 2581432 | * | 4/2013 |

OTHER PUBLICATIONS

Product Sheet (Sell Pentaerythritol Tetrastearate CAS 115-83-3(id:23665820)—EC21, dated Dec. 28, 2017; https://www.ec21.com/offer-detail/Sell-Pentaerythritol-Tetrastearate-CAS-115--23665820.h . . . downloaded on May 4, 2020.*
Bignotti (Bignotti et al, Effect of montmorillonite on the properties of thermosensitive poly(N-isopropylacrylamide) composite hydrogel, Journal of Applied Polymer Science, 2004, 93, 1964-1971).*
Bai, Haihui: "Adsorption dynamics, diffusion and isotherm models of Poly(MPAm/LMSH) nanocomposite hydrogels for the removal of anionic dye Amaranth from an aqueous Soulution", Applied Clay Science,124-125(2016),157-166.
Jinlong Zhang: "Thermoresponsive Copolymer Poly(N-Vinylcaprolactam) Grafted Cellulose Nanocrystals: Synthesis, Structure, and Properties", ACS Sustainable Chemistry & Engineering,2017,5 7439-7447.
Binqiang Xie; "Thermo-thickening behavior of LCST-based copolymer viscosifier for water-based drilling fluids", Journal of Petroleum Science and Engineering,154(2017)244-251.
Binqiang Xie; "Rheological properties of bentonite-free water-based drilling fluids with novel polymer viscosifier", Journal of Petroleum Science and Engineering,164(2018) 302-310.
Yanjun Ren; "Rheological transition of an ethoxylated alkylamine emulsion induced by acetic acid and its application to drilling fluid", Colloids and Surfaces A,567(2019)228-239.

* cited by examiner

*Primary Examiner* — Kumar R Bhushan
(74) *Attorney, Agent, or Firm* — Calfee Halter & Griswold LLP (57) ABSTRACT

The present disclosure relates to a thermosensitive self-plugging bentonite, a preparation method thereof, and a water-based drilling fluid.

13 Claims, 6 Drawing Sheets

THERMOSENSITIVE SELF-PLUGGING BENTONITE AND PREPARATION METHOD THEREOF AND WATER-BASED DRILLING FLUID

PRIORITY CLAIM & CROSS REFERENCE

The application claims priority to Chinese Application No. 201910167197.0, filed on Mar. 6, 2019, entitled "Thermosensitive self-blocking bentonite based on intelligent film formation and application and drilling fluid of thermosensitive self-blocking bentonite", which is specifically and entirely incorporated herein by reference.

FIELD

The present disclosure relates to the technical field of drilling fluid, in particular to a thermosensitive self-plugging bentonite, a preparation method thereof, and a water-based drilling fluid.

BACKGROUND

Because of the deficient energy resources in the shallow layer of stratum, the operations of drilling wells have gradually shifted to the deep layer of stratum in recent years, in order to balance the increasing energy demand of human being. Therefore, it is necessary to vigorously develop the drilling technologies for deep well and ultra-deep well. The borehole stabilization technology is a precondition and a technical core for effectively performing the drilling operations of deep well and ultra-deep well. In particular, the high-temperature and high-pressure stratum environment of deep wells and ultra-deep wells cause that the fluid loss inside the wellbore is serious, its erosion to the stratum is aggravated, and the borehole can hardly be kept stable.

As a result, it has great significance to research and develop a solution concerning how to effectively restrain the fluid loss in the wellbore, thereby maintain stability of the well wall.

SUMMARY

The present disclosure aims to overcome the defects in the prior art that the fluid loss in a wellbore is serious, the erosion to stratum is aggravated and the well wall is difficult to maintain stable, and provides a thermosensitive self-plugging bentonite, a preparation method thereof, and a water-based drilling fluid. The thermosensitive self-plugging bentonite is different from the traditional bentonite, it is based on an intelligent film-forming technology and provided with a flexible temperature switch, can effectively restrain the fluid loss in a wellbore, such that the well wall is kept stable.

In order to fulfill the above purposes, a first aspect of the present disclosure provides a thermosensitive self-plugging bentonite, wherein the thermosensitive self-plugging bentonite has a network structure formed by interleaving bentonite crystal layers, a flexible functional modifying agent is bonded on the surface of the crystal layers and between two adjacent crystal layers, the flexible functional modifying agent is at least one selected from the group consisting of doped N-isopropylacrylamide, methyl methacrylate, ethyl acrylate, benzyl methacrylate, N,N,N',N'-tetramethylethylenediamine, acrylic acid and a stabilizer.

A second aspect of the present disclosure provides a method for preparing thermosensitive self-plugging bentonite, wherein the method comprises the following steps:

(1) Mixing bentonite and concentrated hydrochloric acid and dissolving bentonite in the concentrated hydrochloric acid, and performing a rotary distillation treatment; then subjecting the treated product to washing, drying and grinding treatment, so as to produce an activated bentonite;

(2) Dispersing the activated bentonite in water, then carrying out a first contact with a silane coupling agent to obtain a first mixed solution; subjecting the first mixed solution and chloroform to a miscible process, and performing centrifugation and washing treatment;

(3) Dispersing the product obtained from step (2) in water, then subjecting the product to a second contact with one or more selected from the group consisting of N-isopropylacrylamide, methyl methacrylate, ethyl acrylate, benzyl methacrylate, N,N,N',N'-tetramethylethylenediamine to obtain a second mixed solution; and the second mixed solution and acrylic acid or acrylic ester polymer monomer are subjected to a polymerization addition reaction;

(4) Subjecting the product obtained from step (3) to a third contact with a stabilizer to obtain a third mixed solution, and subjecting the third mixed solution to drying, hot rolling and grinding treatment, thereby prepare the thermosensitive self-plugging bentonite.

A third aspect of the present disclosure provides a water-based drilling fluid, wherein the drilling fluid comprises the aforementioned thermosensitive self-plugging bentonite.

Due to the aforementioned technical solutions, the present disclosure has the following advantages:

(1) The present disclosure designs a high-temperature self-plugging bentonite by adopting surface point modification and interlayer combination intercalation based on hydration erosion of a reservoir and a borehole of a high-temperature stratum.

(2) The thermosensitive self-plugging bentonite of the present application can selectively open and close the thermosensitive bentonite by adjusting the temperature, thereby selectively plugging the micro-nanometer pores and cracks.

(3) The inserted and combined modifying agent in the present disclosure is a flexible linear material, thus the modified agent does not impose an obvious influence on the rheological property of the drilling fluid at a temperature below the opening-closing temperature, so as to ensure a desirable drilling efficiency; an effective plugging can be performed by raising the temperature above the opening-closing temperature, and guarantee a desirable rheological property at the same time.

(4) The present disclosure selects and designs a thermosensitive self-plugging bentonite having a opening-closing temperature within a range of 80–140° C. based on the filtrate loss condition of the stratum, and the thermosensitive bentonite can be selected and tailored according to the temperature of stratum with filtrate loss.

(5) The present disclosure proposes the thermosensitive bentonite for the first time, such that the economical and environment-friendly bentonite has more engineering science application value.

(6) The thermosensitive self-plugging bentonite can realize self-plugging at a high temperature, perform plugging in regard to micro-nanometer micro-pores and micro-cracks at a high temperature, improve the plugging property of the formed mud cakes, and prevent water in a high-temperature wellbore from invading into a hydrated wellbore and a reservoir.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a thermosensitive self-plugging bentonite, wherein the thermosensitive self-plugging bentonite has a network structure formed by interweaving bentonite crystal layers, a flexible functional modifying agent is bonded on the surface of the crystal layers and between two adjacent crystal layers, the flexible functional modifying agent is selected from the group consisting of doped N-isopropylacrylamide, methyl methacrylate, ethyl acrylate, benzyl methacrylate, N,N,N',N'-tetramethylethylenediamine, acrylic acid and a stabilizer.

Figure 1:
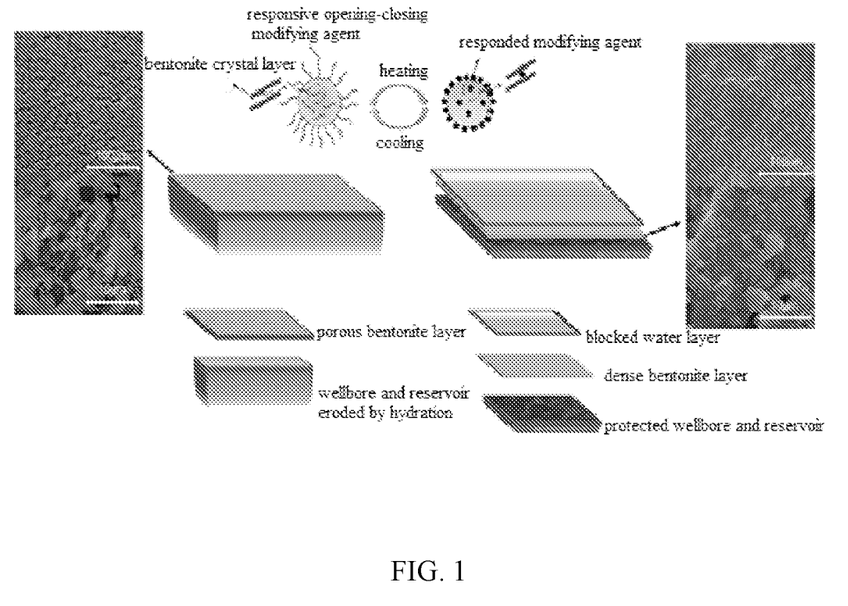
FIG. 1 illustrates a schematic diagram of a plugging process performed by a thermosensitive self-plugging bentonite of the present disclosure.

FIG. 1 illustrates a schematic diagram of a plugging process performed by a thermosensitive self-plugging bentonite of the present disclosure, as can be seen from the left electron micrograph of FIG. 1, when the experimental temperature is below the opening-closing temperature 120-140° C. (the temperature of the targeted filtrate loss stratum), the plugging properties of the modified bentonite are consistent with those of the traditional bentonite, the modified bentonite does not have the plugging and film-forming properties, the film pores and cracks are numerous with a large size; in addition, the left lower part of FIG. 1 shows that the traditional bentonite does not have the opening-closing responsiveness, and the film formed at a temperature of the filtrate loss stratum is porous, so that the water in a wellbore cannot be effectively prevented from invading into the stratum, the stratum is corroded by hydration, thereby causing filtrate loss of the stratum.

As illustrated from the right electron micrograph of FIG. 1, when the experimental temperature reaches the designed opening-closing temperature (i.e., the temperature of the filtrate loss stratum), the pores formed on the film are obviously reduced, a plugging bentonite film with a compact and smooth surface is formed; in addition, the lower left part of FIG. 1 shows that the modified bentonite spontaneously and compactly forms a film at the opening-closing temperature, so that a stratum protective layer is constructed, the water in a well is prevented from invading into the stratum, and the stratum leakage is effectively prevented.

In addition, as illustrated in FIG. 1, the "responsive opening-closing modifying agent" between the bentonite crystal layers is a mixture of N-isopropylacrylamide, benzyl methacrylate, N,N,N',N'-tetramethylethylenediamine and acrylic acid; upon the heating and cooling cycle, the responsive opening-closing modifying agent is converted into a "responded opening-closing modifying agent", i.e., a flexible functional modifying agent.

According to the present disclosure, the flexible functional modifying agent is 10-20 wt %, preferably 10-13 wt %, based on the total weight of the thermosensitive self-plugging bentonite.

According to the present disclosure, the stabilizer is a mixture of anionic carboxymethylcellulose and polyamideamine type dendrimer.

According to the present disclosure, the thermosensitive self-plugging bentonite has an opening-closing temperature within a range of 80-140° C., preferably, the thermosensitive self-plugging bentonite has an opening-closing temperature within a range of 120-140° C. It shall be noted in the present disclosure that the "opening-closing temperature" refers to the response temperature of the opening-closing modifying agent on the bentonite surface, and the modifying agent cross-links and blocks the pores between the crystal structures of bentonite at the response temperature.

According to the present disclosure, the thermosensitive self-plugging bentonite has a weight average molecular weight within a range of 10000-40000, preferably, the thermosensitive self-plugging bentonite has a weight average molecular weight within a range of 30000-40000.

According to the present disclosure, the thermosensitive self-plugging bentonite has an average particle size of 300-500 meshes, preferably, the thermosensitive self-plugging bentonite has an average particle size of 400-500 meshes.

The present disclosure provides a method for preparing thermosensitive self-plugging bentonite, wherein the method comprises the following steps:

(1) mixing bentonite and concentrated hydrochloric acid and dissolving bentonite in the concentrated hydrochloric acid, and performing a rotary distillation treatment; then subjecting the treated product to washing, drying and grinding treatment, so as to produce an activated bentonite;

(2) dispersing the activated bentonite in water, then carrying out a first contact with a silane coupling agent to obtain a first mixed solution; subjecting the first mixed solution and chloroform to a miscible process, and performing centrifugation and washing treatment;

(3) dispersing the product obtained from step (2) in water, then subjecting the product to a second contact with one or more selected from the group consisting of N-isopropylacrylamide, methyl methacrylate, ethyl acrylate, benzyl methacrylate, N,N,N',N'-tetramethylethylenediamine to obtain a second mixed solution; and the second mixed solution and acrylic acid or acrylic ester polymer monomer are subjected to a polymerization addition reaction;

(4) subjecting the product obtained from step (3) to a third contact with a stabilizer to obtain a third mixed solution, and subjecting the third mixed solution to drying, hot rolling and grinding treatment, thereby prepare the thermosensitive self-plugging bentonite.

According to the present disclosure, the activated bentonite in step (1) is obtained through the following steps:

firstly, mixing 2-3 g of bentonite and 100 mL of concentrated hydrochloric acid aqueous solution with a volume concentration of 30% and dissolving the bentonite in the hydrochloric acid solution; preferably, subjecting to magnetically stirring for 5-8 h under the condition of magnetic stirring and the temperature of 35-45° C.; more preferably, subjecting to magnetically stirring for 6-7 h under the conditions including a stirring speed of 100-300 rpm and a temperature of 40-42° C.

Secondly, subjecting the miscible product to a rotary distillation treatment, wherein the conditions of the rotary distillation comprise: the temperature is within a range of 100-120° C., and the time is 5-9 h; preferably, the temperature is within a range of 110-115° C., and the time is 6-8 h.

In addition, washing the product obtained after the rotary distillation treatment by using absolute ethanol, wherein the washing may be performed for 3-5 times, and then drying for 2-4 h, preferably 3 h, at the temperature of 80-90° C.; then grinding the dried product with a solid grinder to prepare the activated bentonite, wherein the activated bentonite has an average particle size of 300-500 meshes, preferably 400-450 meshes.

According to the present disclosure, bentonite binding sites in step (2) are constructed with the following steps:

firstly, the activated bentonite is dispersed in water, the water is preferably distilled water, and the dispersion conditions include: the ultrasonic frequency is within a range of 30-35 KHz, the ultrasonic frequency is preferably 30 KHz; the ultrasonic power is 1.5-1.7 w/cm, preferably 1.5 w/cm; the ultrasonic time is 3-5 h, so as to obtain an aqueous solution containing the activated bentonite; wherein the activated bentonite is contained in an amount of 5-10 g relative to 100 mL of water.

Secondly, the aqueous solution containing the activated bentonite is subjected to a first contact with 3-glycidoxypropyltrimethoxysilane, wherein the conditions of the first contact comprise: the temperature is within a range of 50-58° C., and the time is 2-3 h, so as to obtain a first mixed solution; wherein 3-glycidyloxypropyltrimethoxysilane is used in an amount of 1-2 g relative to 100 mL of water.

In addition, subjecting the first mixed solution and chloroform to a miscible process, wherein the chloroform is used in an amount of 30-50 mL relative to 100 mL of water, and stirring for 2-3 h to obtain a mixed solution containing chloroform; the mixed solution containing chloroform is then subjected to centrifugation for 3-5 min under the rotary condition of 7000-9000 rpm; subsequently dispersing the centrifuged solid isolate in absolute ethanol, and repeatedly washing for 3-5 times.

According to the present disclosure, the modified bentonite in step (3) is combined through the following steps:

firstly, dispersing the product obtained from step (2) in water, then subjecting the product to a second contact with N-isopropylacrylamide and N,N,N',N'-tetramethylethylenediamine, wherein the conditions of the second contact comprise: stirring for 20-30 min under the protection of nitrogen and a condition of ice water bath to obtain a second mixed solution.

Secondly, reacting the second mixed solution with acrylic acid; wherein the reaction conditions include: the temperature is within a range of 65-70° C., and the time is 5-8 h;

wherein the product obtained from step (2) is 3-5 g, the N-isopropylacrylamide is 4-7 g, and the N,N,N',N'-tetramethylethylenediamine is 2-5 g, relative to 200 mL of water;

wherein the volume ratio of the second mixed solution to acrylic acid is 1:(1.15-4.25).

According to the present disclosure, in the step (4), the bentonite particles are bonded with the following steps, so that the stability of the modified bentonite is improved:

firstly, subjecting the product obtained from step (3) to a third contact with a stabilizer to obtain a third mixed solution; wherein the stabilizer is a mixed solution of anionic carboxymethyl cellulose (Lv-PAC) and polyamide-amine type dendrimer (PAMAM); and the volume ratio of the anionic carboxymethyl cellulose to the polyamide-amine type dendrimer is 1:(2-5); and the stabilizer is used in an amount of 2-5 mL relative to 200 mL of water.

Secondly, subjecting the third mixed solution to drying, hot rolling and grinding treatment, the conditions of the drying and hot rolling comprise: the temperature is within a range of 120-130° C., and the time is 24-48 h; thereby prepare the thermosensitive self-plugging bentonite.

According to the present disclosure, the thermosensitive self-plugging bentonite is prepared by using the method. The parameters and properties of the thermosensitive self-plugging bentonite are consistent with those mentioned above, and the details are not repeated here.

In a third aspect, the present disclosure provides a water-based drilling fluid, wherein the water-based drilling fluid comprises the aforementioned thermosensitive self-plugging bentonite.

According to the present disclosure, the water-based drilling fluid contains a mud slurry, the thermosensitive self-plugging bentonite, sodium chloride, anionic carboxymethyl cellulose, a zwitterionic polymer, calcium carbonate and pentaerythrityl tetrastearate (PETS).

Wherein, the anionic carboxymethyl cellulose is Lv-PAC (commonly used pulping agent for drilling fluid), which is purchased from Changzhou Guoyu Environmental Protection Technology Co., Ltd., and the specific parameters are detailed in Table 1 Technical indicators.

TABLE 1

| Items | Technical indicators | |
|---|---|---|
| | PAC-LV | PAC-HV |
| Starch or starch derivatives | None | |
| Water content (%) | ≤10 | |
| Apparent viscosity (mpa · s) | ≤40 | ≥50 |
| API fluid loss (ml) | ≤16 | ≤23 |

The Main Use:
Use of PAC in Drilling Fluids

PAC is ideal as an inhibitor and a filtrate loss reducer, and the slurry fluid prepared with PAC can inhibit the dispersion and expansion of clay and shale in a high-salt medium, so that the well wall pollution is controlled. PAC has advantages over CMC in the aspects such as desirable reaction uniformity, high substitution degree, good transparency, and excellent salt and heat resistance, thus the PAC has higher pulp making quantity (PAC-HV) and lower filtrate loss quantity (PAC-LV) measured by the Oil Company Material Associate (OCMA) standard.

Wherein the zwitterionic polymer is FA367 (pulping agent), which is purchased from Sichuan Xinlin New Material Technology Co., Ltd., the product quality meets the normal industrial standard SY/T5696-95 in China, and the specific parameters are detailed in the technical indicators of the zwitterionic polymer coating agent FA367 for the drilling fluid in Table 2 The product quality meets the normal industrial standard SY/T5696-95 in China Technical indicators of the zwitterionic polymer coating agent FA367 for the drilling fluid.

TABLE 2

| Items | | Indicators |
|---|---|---|
| Water content, % ≤ | | 9.0 |
| Fineness (sieve mesh 0.9 mm screen residue), % ≤ | | 15.0 |
| Apparent viscosity (1% aqueous solution), mPa · s ≥ | | 30.0 |
| pH value | | 7.5-9.0 |
| 4% fresh water base pulp plus 0.2% FA367 | Added amount | 2.0 g/l |
| | Apparent viscosity, ≥ | 25 mPa · s |
| | Filtrate loss, ≤ | 15 ml |
| 15% Complex salt plus 0.7% FA367 | Added amount | 7.0 g/L |
| | Apparent viscosity, ≥ | 15 mPa · s |
| | Filtrate loss, ≤ | 10 ml |

Wherein the Pentaerythrityl tetrastearate (PETS), has a molecular weight of 1201.99, and a molecular formula $C_{77}H_{148}O_8$, it exhibits desirable lubricity, can improve thermal stability of product, and has no toxicity. The product is usually a white hard wax with a high melting point, and is soluble in solvents such as ethanol, benzene and chloroform.

According to the present disclosure, the mud slurry contains the thermosensitive self-plugging bentonite and water, and the thermosensitive self-plugging bentonite is 12-20 g and the water is 300-500 mL based on the total weight of the water-based drilling fluid.

According to the present disclosure, the water-based drilling fluid comprises 12-20 g of thermosensitive self-plugging bentonite, 3-9 g of sodium chloride, 1.5-3 g of anionic carboxymethyl cellulose, 1.5-3 g of zwitterionic polymer, 9-15 g of calcium carbonate and 0.6-1.5 g of pentaerythrityl tetrastearate, based on the total weight of the water-based drilling fluid.

According to the present disclosure, the water-based drilling fluid further comprises barite powder, and the barite powder has an average particle size of 200-500 meshes. In the present disclosure, the barite powder is used for adjusting density of the water-based drilling fluid, and the water-based drilling fluid has a density within a range of 1.5-3.0 $g/cm^3$, preferably 2.0 $g/cm^3$.

The present disclosure will be described in detail below with reference to examples.

Example 1

This example illustrates the thermosensitive self-plugging bentonite prepared with the method of the present disclosure.

(1) Activating Bentonite:

2 g of bentonite was taken and mixed with 100 mL of concentrated hydrochloric acid aqueous solution having a volumetric concentration of 30%, the mixture was magnetically stirred at 35° C. for 5 h, and then subjected to rotary distilling at 100° C. for 5 h and a drying process;

The dried product was repeatedly washed with absolute ethanol for 3 times, then subjected to drying at 80° C. for 3 hours, the bentonite was ground by using a solid crusher until the average particle size was 300 meshes, such that the activated bentonite was produced.

(2) Constructing a Bentonite Binding Site:

5 g of activated bentonite was dispersed in 100 mL of distilled water, and an ultrasonic dispersion device was added, the mixture was subjected to ultrasonic dispersion and stirring for 3 h. 1.2 g of 3-glycidyloxypropyltrimethoxysilane was then added, mixed and stirred for 2 h, the reaction temperature was 50° C. After the reaction was completed, 30 ml of chloroform was added into the mixed solution and stirred for 2 h. The mixed solution was then centrifuged at 7000 rpm for 3 min. The centrifuged solid isolate was subsequently dispersed in absolute ethanol and washed repeatedly for 3 times.

(3) Combining Modified Bentonite:

3 g of washed precipitate was taken and dissolved in 200 mL of distilled water, 4 g of N-isopropylacrylamide and 2 g of N,N,N',N'-tetramethylethylenediamine are added to the solution and stirred for 20 min in an ice-water bath under a protection of nitrogen. Acrylic acid was then added to the stirred mixture based on a volume ratio of 1:1.15, and the mixture was placed in a hot rolling oven at 65° C. to carry out reaction for 5 h.

(4) Binding Bentonite Particles:

2 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:2, the mixed solution was sealed in an aging tank, and subjected to a hot rolling at 120° C. for 24 h; the mixed solution was subjected to drying and hot rolling, the residual solid was ground by using a solid grinder until the average particle size of the residual solid was 300 meshes, such that the thermosensitive self-plugging bentonite was prepared.

Example 2

This example illustrates the thermosensitive self-plugging bentonite prepared with the method of the present disclosure.

(1) Activating Bentonite:

2 g of bentonite was taken and mixed with 100 mL of concentrated hydrochloric acid aqueous solution having a volumetric concentration of 30%, the mixture was magnetically stirred at 45° C. for 8 h, and then subjected to rotary distilling at 120° C. for 9 h and a drying process;

The dried product was repeatedly washed with absolute ethanol for 5 times, then subjected to drying at 90° C. for 3 hours, the bentonite was ground by using a solid crusher until the average particle size was 500 meshes, such that the activated bentonite was produced.

(2) Constructing a Bentonite Binding Site:

5 g of activated bentonite was dispersed in 100 mL of distilled water, and an ultrasonic dispersion device was added, the mixture was subjected to ultrasonic dispersion and stirring for 5 h. 1.6 g of 3-glycidyloxypropyltrimethoxysilane was then added, mixed and stirred for 3 h, the reaction temperature was 58° C. After the reaction was completed, 30 ml of chloroform was added into the mixed solution and stirred for 3 h. The mixed solution was then centrifuged at 9000 rpm for 5 min. The centrifuged solid isolate was subsequently dispersed in absolute ethanol and washed repeatedly for 5 times.

(3) Combining Modified Bentonite:

3 g of washed precipitate was taken and dissolved in 200 mL of distilled water, 4 g of N-isopropylacrylamide and 2 g of N,N,N',N'-tetramethylethylenediamine are added to the solution and stirred for 30 min in an ice-water bath under a protection of nitrogen. Acrylic acid was then added to the stirred mixture based on a volume ratio of 1:1.42, and the mixture was placed in a hot rolling oven at 70° C. to carry out reaction for 8 h.

(4) Binding Bentonite Particles:

2 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:2, the mixed solution was sealed in an aging tank, and subjected to a hot rolling at 130° C. for 48 h; the mixed solution was subjected to drying and hot rolling, the residual solid was ground by using a solid grinder until the average particle size of the residual solid was 500 meshes, such that the thermosensitive self-plugging bentonite was prepared.

Example 3

This example illustrates the thermosensitive self-plugging bentonite prepared with the method of the present disclosure.

(1) Activating Bentonite:

2 g of bentonite was taken and mixed with 100 mL of concentrated hydrochloric acid aqueous solution having a volumetric concentration of 30%, the mixture was magnetically stirred at 40° C. for 6 h, and then subjected to rotary distilling at 110° C. for 7 h and a drying process;

The dried product was repeatedly washed with absolute ethanol for 4 times, then subjected to drying at 85° C. for 3 hours, the bentonite was ground by using a solid crusher until the average particle size was 400 meshes, such that the activated bentonite was produced.

(2) Constructing a Bentonite Binding Site:

5 g of activated bentonite was dispersed in 100 mL of distilled water, and an ultrasonic dispersion device was added, the mixture was subjected to ultrasonic dispersion and stirring for 4 h. 1.8 g of 3-glycidyloxypropyltrimethoxysilane was then added, mixed and stirred for 2.5 h, the reaction temperature was 55° C. After the reaction was completed, 30 ml of chloroform was added into the mixed solution and stirred for 2.5 h. The mixed solution was then centrifuged at 8000 rpm for 4 min. The centrifuged solid isolate was subsequently dispersed in absolute ethanol and washed repeatedly for 4 times.

(3) Combining Modified Bentonite:

3 g of washed precipitate was taken and dissolved in 200 mL of distilled water, 4 g of N-isopropylacrylamide and 2 g of N,N,N',N'-tetramethylethylenediamine are added to the solution and stirred for 20-30 min in an ice-water bath under a protection of nitrogen. Acrylic acid was then added to the stirred mixture based on a volume ratio of 1:3.15, and the mixture was placed in a hot rolling oven at 68° C. to carry out reaction for 7 h.

(4) Binding Bentonite Particles:

2 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:2, the mixed solution was sealed in an aging tank, and subjected to a hot rolling at 125° C. for 30 h; the mixed solution was subjected to drying and hot rolling, the residual solid was ground by using a solid grinder until the average particle size of the residual solid was 400 meshes, such that the thermosensitive self-plugging bentonite was prepared.

Example 4

This example illustrates the thermosensitive self-plugging bentonite prepared with the method of the present disclosure.

(1) Activating Bentonite:

2 g of bentonite was taken and mixed with 100 mL of concentrated hydrochloric acid aqueous solution having a volumetric concentration of 30%, the mixture was magnetically stirred at 33° C. for 7 h, and then subjected to rotary distilling at 115° C. for 6 h and a drying process;

The dried product was repeatedly washed with absolute ethanol for 5 times, then subjected to drying at 90° C. for 3 hours, the bentonite was ground by using a solid crusher until the average particle size was 450 meshes, such that the activated bentonite was produced.

(2) Constructing a Bentonite Binding Site:

5 g of activated bentonite was dispersed in 100 mL of distilled water, and an ultrasonic dispersion device was added, the mixture was subjected to ultrasonic dispersion and stirring for 5 h. 1 g of 3-glycidyloxypropyltrimethoxysilane was then added, mixed and stirred for 3 h, the reaction temperature was 53° C. After the reaction was completed, 30 ml of chloroform was added into the mixed solution and stirred for 3 h. The mixed solution was then centrifuged at 8500 rpm for 3 min. The centrifuged solid isolate was subsequently dispersed in absolute ethanol and washed repeatedly for 4 times.

(3) Combining Modified Bentonite:

3 g of washed precipitate was taken and dissolved in 200 mL of distilled water, 4 g of N-isopropylacrylamide and 2 g of N,N,N',N'-tetramethylethylenediamine are added to the solution and stirred for 20-30 min in an ice-water bath under a protection of nitrogen. Acrylic acid was then added to the stirred mixture based on a volume ratio of 1:4.25, and the mixture was placed in a hot rolling oven at 66° C. to carry out reaction for 6 h.

(4) Binding Bentonite Particles:

2 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:2, the mixed solution was sealed in an aging tank, and subjected to a hot rolling at 123° C. for 45 h; the mixed solution was subjected to drying and hot rolling, the residual solid was ground by using a solid grinder until the average particle size of the residual solid was 450 meshes, such that the thermosensitive self-plugging bentonite was prepared.

Example 5

This example illustrates the thermosensitive self-plugging bentonite prepared with the method of the present disclosure.

(1) Activating Bentonite:

2 g of bentonite was taken and mixed with 100 mL of concentrated hydrochloric acid aqueous solution having a volumetric concentration of 30%, the mixture was magnetically stirred at 42° C. for 6 h, and then subjected to rotary distilling at 105° C. for 8 h and a drying process;

The dried product was repeatedly washed with absolute ethanol for 5 times, then subjected to drying at 88° C. for 3 hours, the bentonite was ground by using a solid crusher until the average particle size was 480 meshes, such that the activated bentonite was produced.

(2) Constructing a Bentonite Binding Site:

10 g of activated bentonite was dispersed in 100 mL of distilled water, and an ultrasonic dispersion device was added, the mixture was subjected to ultrasonic dispersion and stirring for 4.5 h. 2 g of 3-glycidyloxypropyltrimethoxysilane was then added, mixed and stirred for 2 h, the reaction temperature was 57° C. After the reaction was completed, 50 ml of chloroform was added into the mixed solution and stirred for 3 h. The mixed solution was then centrifuged at 7500 rpm for 5 min. The centrifuged solid isolate was subsequently dispersed in absolute ethanol and washed repeatedly for 5 times.

(3) Combining Modified Bentonite:

3 g of washed precipitate was taken and dissolved in 200 mL of distilled water, 7 g of N-isopropylacrylamide and 5 g of N,N,N',N'-tetramethylethylenediamine are added to the solution and stirred for 20-30 min in an ice-water bath under a protection of nitrogen. Acrylic acid was then added to the stirred mixture based on a volume ratio of 1:1.15, and the mixture was placed in a hot rolling oven at 67° C. to carry out reaction for 6.5 h.

(4) Binding Bentonite Particles:

5 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:5, the mixed solution was sealed in an aging tank, and subjected to a hot rolling at 128° C. for 40 h; the mixed solution was subjected to drying and hot rolling, the residual solid was ground by using a solid grinder until the average particle size of the residual solid was 480 meshes, such that the thermosensitive self-plugging bentonite was prepared.

Example 6

This example illustrates the thermosensitive self-plugging bentonite prepared with the method of the present disclosure.

(1) Activating Bentonite:

2.5 g of bentonite was taken and mixed with 100 mL of concentrated hydrochloric acid aqueous solution having a volumetric concentration of 30%, the mixture was magnetically stirred at 38° C. for 7.5 h, and then subjected to rotary distilling at 115° C. for 7.5 h and a drying process;

The dried product was repeatedly washed with absolute ethanol for 5 times, then subjected to drying at 90° C. for 3 hours, the bentonite was ground by using a solid crusher until the average particle size was 380 meshes, such that the activated bentonite was produced.

(2) Constructing a Bentonite Binding Site:

7 g of activated bentonite was dispersed in 100 mL of distilled water, and an ultrasonic dispersion device was added, the mixture was subjected to ultrasonic dispersion and stirring for 5 h. 1.5 g of 3-glycidyloxypropyltrimethoxysilane was then added, mixed and stirred for 3 h, the reaction temperature was 55° C. After the reaction was completed, 40 ml of chloroform was added into the mixed solution and stirred for 3 h. The mixed solution was then centrifuged at 8800 rpm for 4 min. The centrifuged solid isolate was subsequently dispersed in absolute ethanol and washed repeatedly for 5 times.

(3) Combining Modified Bentonite:

4 g of washed precipitate was taken and dissolved in 200 mL of distilled water, 5 g of N-isopropylacrylamide and 4 g of N,N,N',N'-tetramethylethylenediamine are added to the solution and stirred for 20-30 min in an ice-water bath under a protection of nitrogen. Acrylic acid was then added to the stirred mixture based on a volume ratio of 1:4.25, and the mixture was placed in a hot rolling oven at 65° C. to carry out reaction for 7 h.

(4) Binding Bentonite Particles:

3 mL of a stabilizer DWP was then added, the DWP was a mixed solution of Lv-PAC (low-viscosity polyanionic cellulose for drilling fluid) and PAMAM (polyamide-amine type dendrimer) with a volume ratio of 1:3, the mixed solution was sealed in an aging tank, and subjected to a hot rolling at 120° C. for 45 h; the mixed solution was subjected to drying and hot rolling, the residual solid was ground by using a solid grinder until the average particle size of the residual solid was 380 meshes, such that the thermosensitive self-plugging bentonite was prepared.

Example 7

This example illustrates the preparation of a water-based drilling fluid according to the present disclosure.

(1) The thermosensitive self-plugging bentonite prepared in Example 4 was prehydrated, 12 g of the thermosensitive self-plugging bentonite was mixed with 300 mL of pure water, the mixture was stirred at a temperature of 30° C. for 5 h to prepare a mud slurry.

(2) 3 g of sodium chloride particles was added into the mud slurry, the mixture was stirred at a temperature of 30° C. for 9 h to enhance the hydration dispersion of the mud slurry.

(3) 1.5 g of anionic carboxymethyl cellulose Lv-PAC and 1.5 g of zwitterionic polymer FA367 were added for microwave oscillation and stirring for 7 h, so as to enhance the stability and the rock-suspension property of the drilling fluid.

(4) 9 g of common inert plugging material ultrafine calcium carbonate with a particle size of 2000 meshes was further added, and the materials were sufficiently mixed and stirred for 16 h at the stirring speed of 700 rpm.

(5) 0.6 g of pentaerythrityl tetrastearate PETs was then added and the mixture was stirred for 16 h.

(6) Finally, the weighting material barite powder having an average particle size of 2000 meshes was gradually added into the prepared base fluid, and the mixture was subjected to a strong mechanical stirring at a stirring speed of 800 rpm until the density of the drilling fluid reached 2.0 g/cm$^3$.

Example 8

This example illustrates the preparation of a water-based drilling fluid according to the present disclosure.

(1) The thermosensitive self-plugging bentonite prepared in Example 4 was prehydrated, 12 g of the thermosensitive self-plugging bentonite was mixed with 300 mL of pure water, the mixture was stirred at a temperature of 50° C. for 4 h to prepare a mud slurry.

(2) 9 g of sodium chloride particles was added into the mud slurry, the mixture was stirred at a temperature of 50° C. for 7 h to enhance the hydration dispersion of the mud slurry.

(3) 3 g of anionic carboxymethyl cellulose Lv-PAC and 3 g of zwitterionic polymer FA367 were added for microwave oscillation and stirring for 10 h, so as to enhance the stability and the rock-suspension property of the drilling fluid.

(4) 15 g of common inert plugging material ultrafine calcium carbonate with a particle size of 2000 meshes was further added, and the materials were sufficiently mixed and stirred for 12 h at the stirring speed of 500 rpm.

(5) 1.5 g of pentaerythrityl tetrastearate PETs was then added and the mixture was stirred for 10 h.

(6) Finally, the weighting material barite powder having an average particle size of 400 meshes was gradually added into the prepared base fluid, and the mixture was subjected to a strong mechanical stirring at a stirring speed of 500 rpm until the density of the drilling fluid reached 2.0 g/cm$^3$.

Example 9

This example illustrates the preparation of a water-based drilling fluid according to the present disclosure.

(1) The thermosensitive self-plugging bentonite prepared in Example 4 was prehydrated, 12 g of the thermosensitive self-plugging bentonite was mixed with 300 mL of pure water, the mixture was stirred at a temperature of 40° C. for 4.5 h to prepare a mud slurry.

(2) 6 g of sodium chloride particles was added into the mud slurry, the mixture was stirred at a temperature of 40° C. for 8 h to enhance the hydration dispersion of the mud slurry.

(3) 2 g of anionic carboxymethyl cellulose Lv-PAC and 2 g of zwitterionic polymer FA367 were added for microwave oscillation and stirring for 9 h, so as to enhance the stability and the rock-suspension property of the drilling fluid.

(4) 12 g of common inert plugging material ultrafine calcium carbonate with a particle size of 2000 meshes was further added, and the materials were sufficiently mixed and stirred for 14 h at the stirring speed of 600 rpm.

(5) 1.0 g of pentaerythrityl tetrastearate PETs was then added and the mixture was stirred for 14 h.

(6) Finally, the weighting material barite powder having an average particle size of 400 meshes was gradually added into the prepared base fluid, and the mixture was subjected to a strong mechanical stirring at a stirring speed of 700 rpm until the density of the drilling fluid reached 2.0 g/cm$^3$.

Comparative Example 1

(1) The ordinary bentonite was prehydrated, 12 g of thermosensitive self-plugging bentonite and 300 mL of pure water are mixed, and stirred at a temperature of 50° C. for 5 h to prepare a mud slurry.

(2) 3 g of sodium chloride particles was added into the mud slurry, the mixture was stirred at a temperature of 50° C. for 9 h to enhance the hydration dispersion of the mud slurry.

(3) 1.5 g of anionic carboxymethyl cellulose Lv-PAC and 1.5 g of zwitterionic polymer FA367 were added for microwave oscillation and stirring for 10 h, so as to enhance the stability and the rock-suspension property of the drilling fluid.

(4) 9 g of common inert plugging material ultrafine calcium carbonate with a particle size of 2000 meshes was further added, and the materials were sufficiently mixed and stirred for 16 h at the stirring speed of 700 rpm.

(5) 0.6 g of pentaerythrityl tetrastearate PETs was then added and the mixture was stirred for 16 h.

(6) Finally, the weighting material barite powder having an average particle size of 400 meshes was gradually added into the prepared base fluid, and the mixture was subjected to a strong mechanical stirring at a stirring speed of 800 rpm until the density of the drilling fluid reached 2.0 g/cm$^3$.

Experimental Example 1

This experimental example was used for demonstrating an experiment of the film-forming property of thermosensitive self-plugging bentonite.

The present disclosure adopted a high-temperature high-pressure plugging instrument to simulate the high-temperature high-pressure stratum environment, and evaluated the thermal sensitivity and plugging property of the thermosensitive self-plugging bentonite at a high temperature through variations of the fluid filtrate loss and the electrical conductivity.

The present disclosure prepared bentonite slurries with a mass fraction of 3% by using the thermosensitive self-plugging bentonite prepared in Examples 1 to 4 and the conventional bentonite respectively, and the bentonite slurries were subjected to a pressing and filtering process for 30 min by using a high temperature and high pressure filtrate loss instrument, such that a filtrate loss reduction membrane was produced (the pressure in the pressing and filtering process was 3.5 MPa, the temperature was 20° C.). Then, the residual water in the filter-pressing kettle was poured out, a sodium chloride ion aqueous solution was added and subjected to the filter-pressing for 30 min (the pressure was 3.5 MPa), the filtrate was collected for calculating the filtrate loss amount, the conductivity of the filtrate was measured by using a conductivity meter. The experimental results were shown in FIG. 2 and FIG. 3; wherein T1, T2, T3 and T4 represented the thermosensitive self-plugging bentonite prepared in Examples 1 to 4 respectively, and the unmodified bentonite represented the conventional bentonite.

Figure 2:
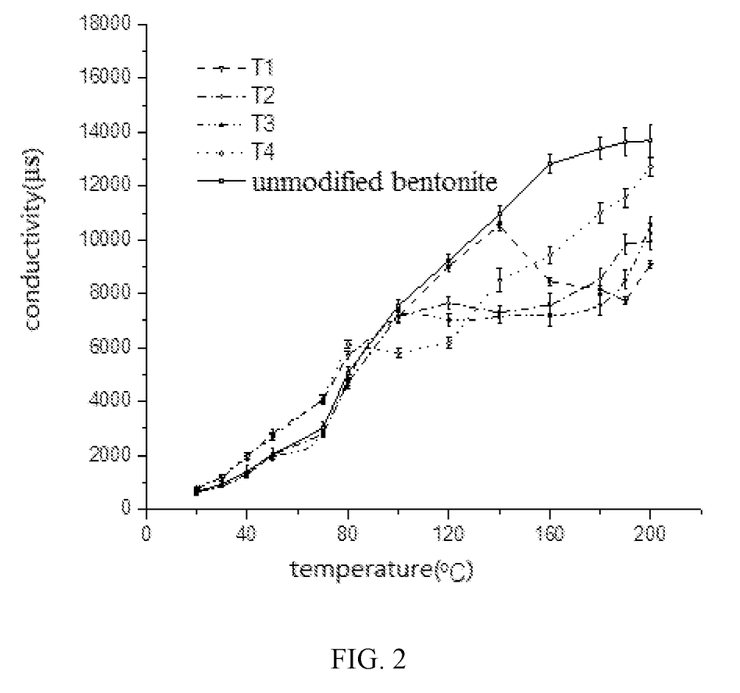
FIG. 2 illustrates a curve chart showing the variation of conductivity along with temperature of slurries containing the thermosensitive self-plugging bentonite prepared in Examples 1 to 4 and the unmodified bentonite prepared in Comparative example 1.
Figure 3:
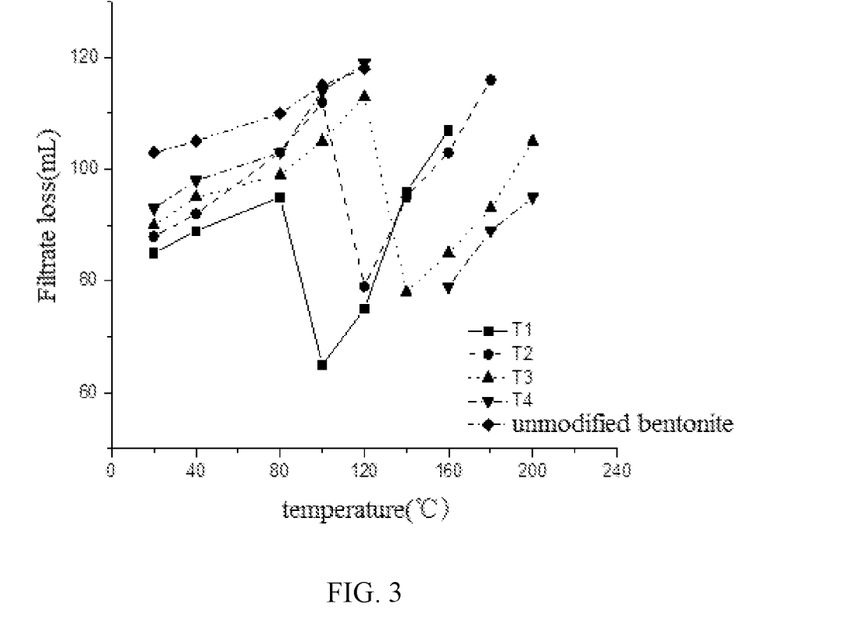
FIG. 3 illustrates a curve chart showing the variation of filtrate loss along with temperature of slurries containing the thermosensitive self-plugging bentonite prepared in Examples 1 to 4 and the unmodified bentonite prepared in Comparative example 1.

As can be seen from FIG. 2 and FIG. 3, the conventional bentonite had poor temperature resistance, the filtrate loss amount and the filtrate conductivity were significantly increased along with the temperature rise, it indicated that the formed filtration reduction membrane was damaged.

However, the thermosensitive self-plugging bentonite had a remarkable high-temperature self-plugging phenomenon, the film formed by the thermosensitive self-plugging bentonite in the initial stage did not impose an obviously inhibitive function along with the temperature rise; however, when the temperature reached the designed self-plugging temperature, it was visible that the electrical conductivity and the filtrate loss amount were remarkably reduced, the curve had a remarkable inflection point, the self-plugging behavior of the thermosensitive self-plugging bentonite film was verified, and the plugging performance of the filtration reduction membrane following the self-plugging process may be enhanced by 50~200%.

Figure 4:
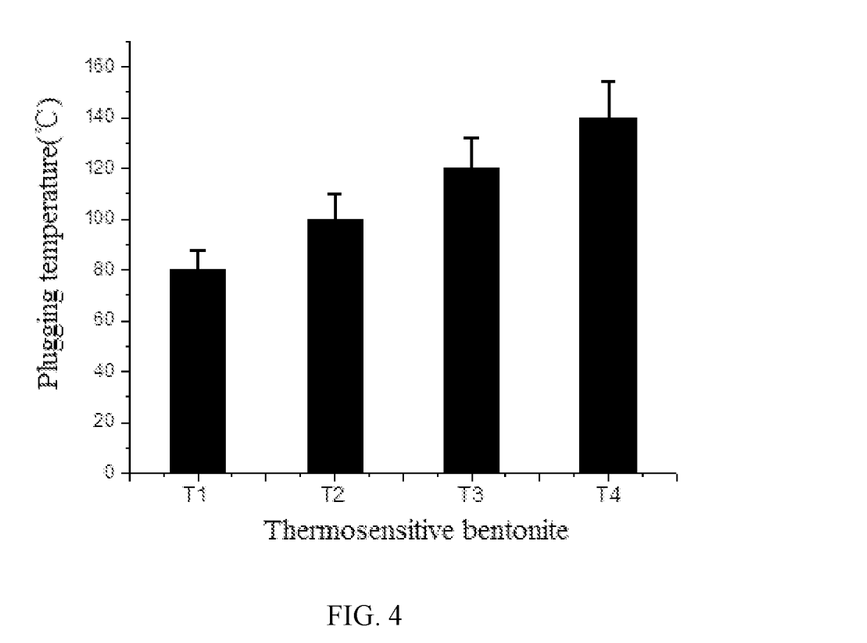
FIG. 4 illustrates a self-plugging temperature graph of the thermosensitive self-plugging bentonite prepared in Examples 1-4.
Figure 5:
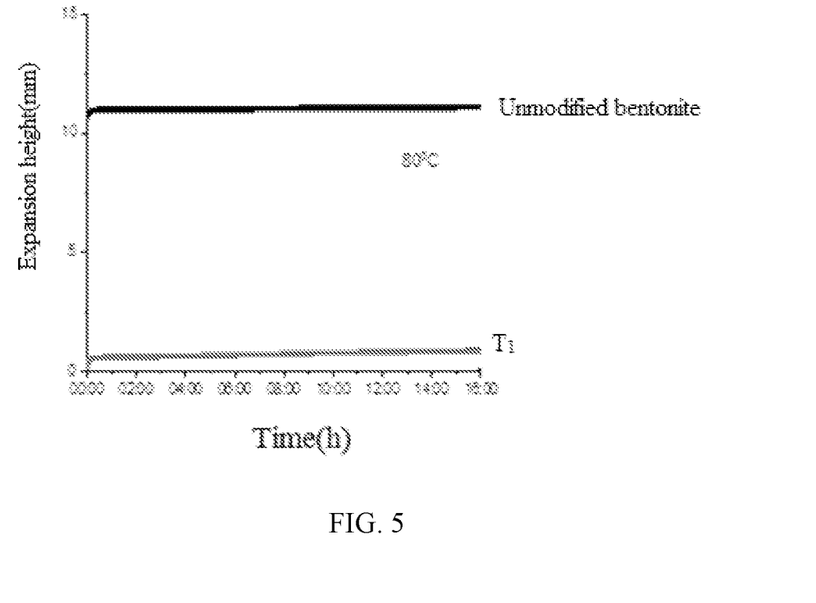
FIG. 5 illustrates a curve chart showing effect of the thermosensitive self-plugging bentonite prepared in Example 1 and the unmodified bentonite prepared in Comparative example 1 on the hydration expansion of Longmaxi shale.
Figure 6:
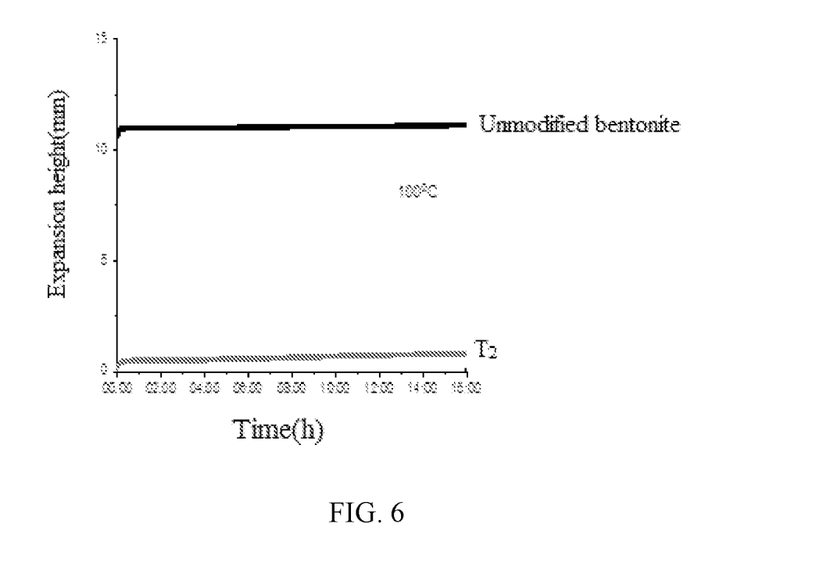
FIG. 6 illustrates a curve chart showing the effect of the thermosensitive self-plugging bentonite prepared in Example 2 and the unmodified bentonite prepared in Comparative example 1 on the hydration expansion of Longmaxi shale.
Figure 7:
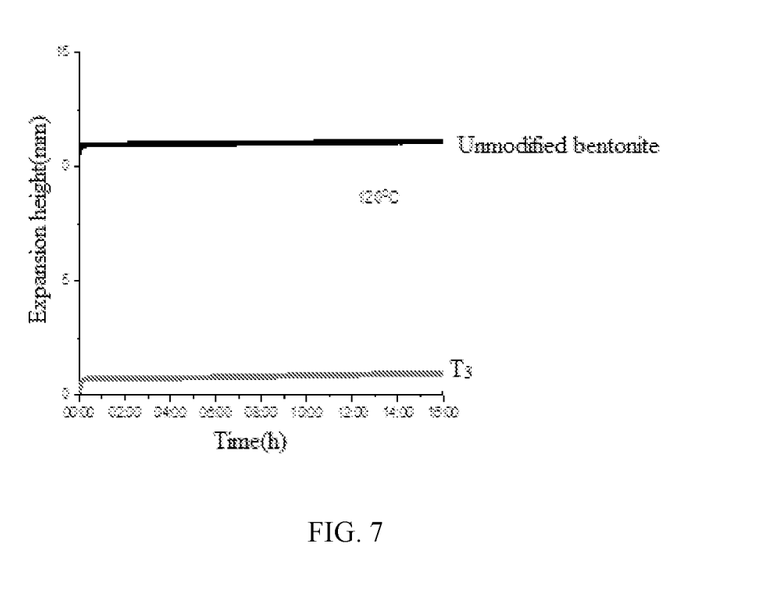
FIG. 7 illustrates a curve chart showing the effect of the thermosensitive self-plugging bentonite prepared in Example 3 and the unmodified bentonite prepared in Comparative example 1 on the hydration expansion of Longmaxi shale.
Figure 8:
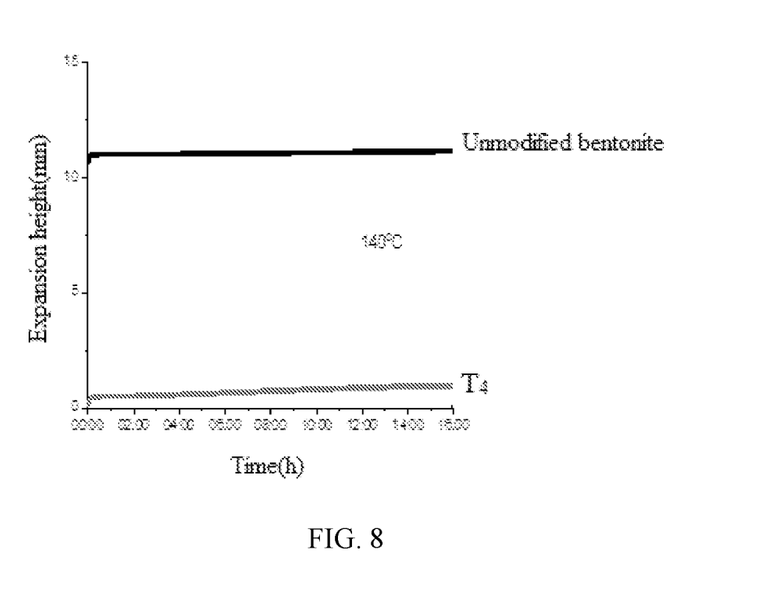
FIG. 8 illustrates a curve chart showing the effect of the thermosensitive self-plugging bentonite prepared in Example 4 and the unmodified bentonite prepared in Comparative example 1 on the hydration expansion of Longmaxi shale.

In addition, the experimental results further indicated that the stronger was the temperature resistance of the thermosensitive self-plugging bentonite, more time was the performance of the self-plugging behavior lagged behind, the response temperatures of the thermosensitive self-plugging bentonite were 80° C., 100° C., 120° C. and 140° C. respectively, and the experimental error was less than 5%, as shown in FIG. 4. The engineer for on-site construction can employ different temperature-resistant thermosensitive bentonites according to the actual temperature condition of the filtrate loss stratum.

Experimental Example 2

This experimental example intended to illustrate the effect of thermosensitive self-plugging bentonite on hydration of the mud shale.

At present, the borehole wall instability mostly occurred in the water-sensitive shale stratum. Therefore, the influence of the thermosensitive self-plugging bentonite slurry intelligently formed into a film on the hydration expansion of the mud shale was researched in the present disclosure by taking a group of the Longmaxi water-sensitive shale as the research object under the conditions of high temperature and high pressure and with respect to different plugging temperatures.

Preparing mud slurry: the conventional bentonite and the thermosensitive self-plugging bentonite being capable of intelligently forming a film in Examples 1 to 4 were respectively taken for preparing the mud slurries, 300 mL of distilled water was prepared, 4 g of unmodified bentonite or the thermosensitive self-plugging bentonite being capable of intelligently forming a film were respectively added into the distilled water, and subjected to stirring for 12-16 h, the mixed solutions were marked as unmodified bentonite, T1, T2, T3 and T4 respectively.

The experimental contents were as follows: firstly, a part of shale was chiseled and crushed into powder (with a particle size of 500 meshes) by using a solid crusher. 5 g of shale powder was then taken and placed in a rock core pressing device, and was pressed for 10 min to prepare an experimental rock core, wherein the experimental pressure was 10 MPa. The experimental core was then placed in a rock core cup of a high-temperature high-pressure dilatometer (purchased from Qingdao Tongchun Petroleum Instrument Factory in China), 10 mL of mud slurry was subsequently injected into the rock core cup, setting and recording the variation of the linear expansion rate of the rock cores within 16 hours at different temperatures (the experimental pressure was 3.5 MPa), wherein the calculation formula of the linear expansion rate was shown as the following formula.

$$H_\omega = R_t - R_0$$

$$\omega = (R_t - R_0)/H \times 100\%$$

Wherein $H_\omega$ is the expansion thickness, mm;
$\omega$ is the linear expansion rate of rock core, %;
$R_t$ is the height reading of the rock core at the time t, mm;
$R_0$ is the initial height reading of the rock core, mm;
H is the initial length of the rock core, mm.

The experimental results were shown in FIG. 5, FIG. 6, FIG. 7 and FIG. 8.

As can be seen from the figures, the ordinary bentonite had poor effect of inhibiting hydration expansion of the mud shale, which showed that the film forming effect was poor and the temperature resistance was not desirable. However, in contrast, the thermosensitive self-plugging bentonite with different response temperatures exhibited the remarkable plugging behavior under the condition of response temperature, and can substantially and completely inhibit the hydration expansion of the mud shale. The on-site engineers can select different thermosensitive self-plugging bentonite for film-forming and plugging according to the specific stratum temperature.

Experimental Example 3

This experimental example intended to illustrate the performance test of drilling fluid.

The performance test of drilling fluid was as follows: the drilling fluids of the Example 7 and the Comparative examples were placed in an aging tank for hot rolling and aging, the rheological changes of the drilling fluids were measured by using a rotary viscometer, and were marked as a test sample and a comparative sample respectively, the experimental results were shown in FIG. 9.

Figure 9:
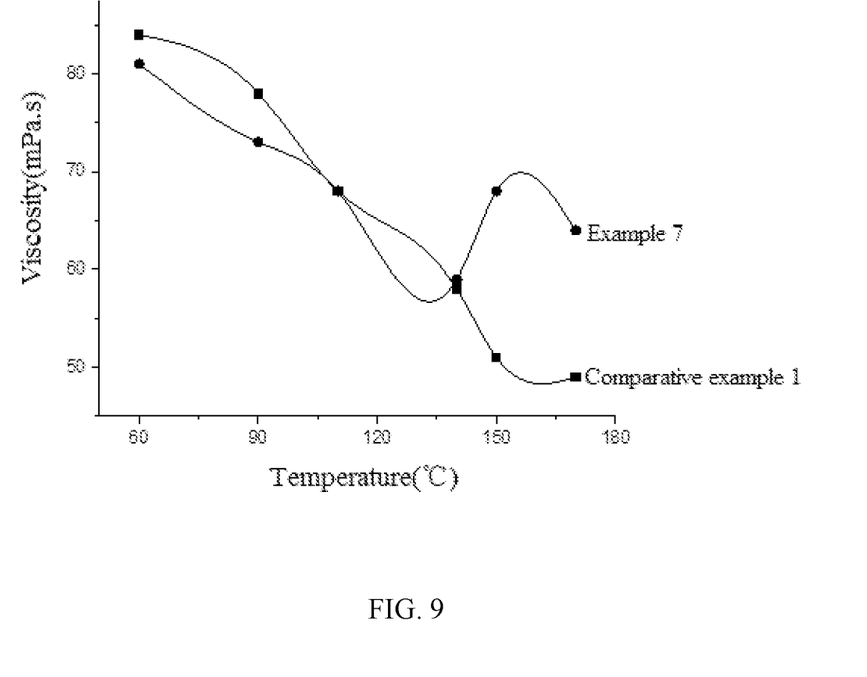
FIG. 9 illustrates a graph showing the variation of viscosity along with temperature in regard to a water-based drilling fluid containing the thermosensitive self-plugging bentonite prepared in Example 7 and a water-based drilling fluid containing the unmodified bentonite prepared in Comparative example 1.

FIG. 9 reflected the viscosity variation curves of the two types of drilling fluids along with the temperature change, FIG. 9 illustrated that the conventional bentonite drilling fluid had a gradually reduced viscosity along with the temperature rise, and the rheological property of the drilling fluid was extremely unstable. The rheological curve of the drilling fluid prepared by using the thermosensitive self-plugging bentonite of the present disclosure may show two obvious inflection points, the viscosity of the drilling fluid at the early stage was reduced along with the temperature rise, but the viscosity of the drilling fluid gradually hiked after the temperature was higher than 140° C., the drilling fluid reflected its self-repairing performance, the rheological property of the drilling fluid tended to be stable, the viscosity at the later stage was continuously reduced resulting from the thermal degradation effect of the high-temperature on the polymer. Generally speaking, the drilling fluid of the thermosensitive self-plugging bentonite of the present disclosure was suitable for high-temperature drilling, and the applicable temperature was within a range of 140-170° C.

Subsequently, the drilling fluids of Example 7 and Comparative example were placed in a 150° C. high temperature and high pressure dilatometer and a 150° C. high temperature and high pressure percolator, respectively, such that the high temperature plugging properties of the drilling fluids were measured and recorded as a test sample and a comparative sample, respectively, and the test results were shown in FIG. 10 and FIG. 11.

Figure 10:
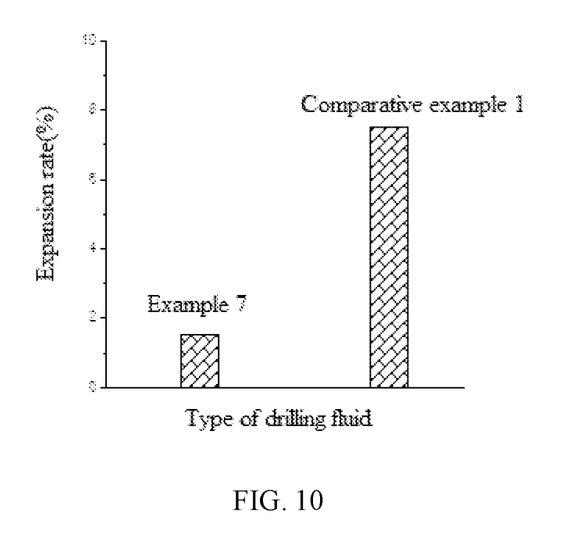
FIG. 10 illustrates a graph comparing the expansion rates of a water-based drilling fluid containing the thermosensitive self-plugging bentonite prepared in Example 7 and a water-based drilling fluid containing the unmodified bentonite prepared in Comparative example 1.
Figure 11:
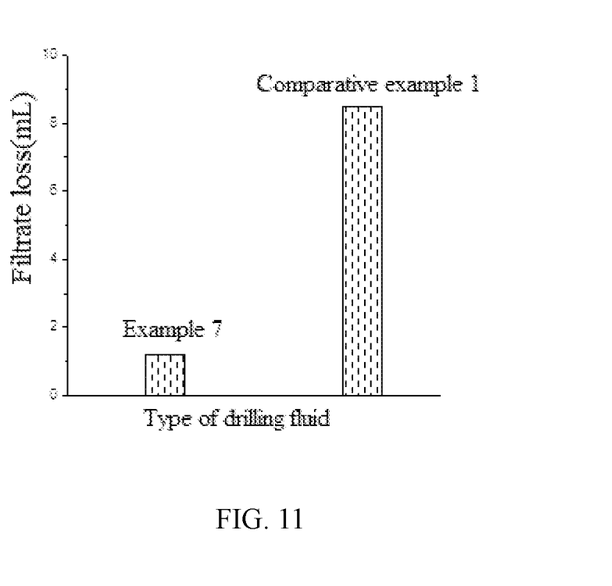
FIG. 11 illustrates a graph comparing the filtrate losses of a water-based drilling fluid containing the thermosensitive self-plugging bentonite prepared in Example 7 and a water-based drilling fluid containing the unmodified bentonite prepared in Comparative example 1.

As illustrated in FIG. 10 and FIG. 11, the drilling fluid of the present disclosure exhibited obviously stronger plugging property than the conventional drilling fluid under the conditions comprising a temperature of 140° C. and a pressure of 3.5 mPa, the linear expansion rate of the shale was reduced from 7.5% to 1.5%, and the filtration loss was lowered from 8.5 mL to 1.2 mL. The experimental results verified the thermal responsiveness of the drilling fluid of the present disclosure.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A water-based drilling fluid, comprising a mud slurry, a thermosensitive self-plugging bentonite, sodium chloride, an anionic carboxymethyl cellulose, a zwitterionic polymer, calcium carbonate, and pentaerythrityl tetrastearate;
wherein the thermosensitive self-plugging bentonite has a network structure formed by interleaving bentonite crystal layers, a flexible functional modifying agent is bonded on the surface of the crystal layers and between two adjacent crystal layers, the flexible functional modifying agent is at least one selected from the group consisting of N-isopropylacrylamide, methyl methacrylate, ethyl acrylate, benzyl methacrylate, N,N,N',N'-tetramethylethylenediamine, acrylic acid and a stabilizer;
wherein the thermosensitive self-plugging bentonite is 12-20 g, the sodium chloride is 3-9 g, the anionic carboxymethyl cellulose is 1.5-3 g, the zwitterionic polymer is 1.5-3 g, the calcium carbonate is 9-15 g, the pentaerythrityl tetrastearate is 0.6-1.5 g, and water is 300-500 mL, based on the total weight of the water-based drilling fluid.

2. The water-based drilling fluid of claim 1, wherein the flexible functional modifying agent is 10-20 wt % based on the total weight of the thermosensitive self-plugging bentonite.

3. The water-based drilling fluid of claim 1, wherein the stabilizer is a mixture of anionic carboxymethyl cellulose and polyamide-amine type dendrimer.

4. The water-based drilling fluid of claim 1, wherein the thermosensitive self-plugging bentonite has an opening-closing temperature within a range of 80-140° C.

5. The water-based drilling fluid of claim 4, wherein the thermosensitive self-plugging bentonite has an opening-closing temperature within a range of 120-140° C.

6. The water-based drilling fluid of claim 1, wherein the thermosensitive self-plugging bentonite has an average particle size of 300-500 meshes.

7. A method for preparing the water-based drilling fluid of claim 1, comprising a step of preparing the thermosensitive self-plugging bentonite, wherein the step of preparing the thermosensitive self-plugging bentonite comprises the following steps:
(1) mixing bentonite and concentrated hydrochloric acid and dissolving bentonite in the concentrated hydrochloric acid, and performing rotary distillation treatment; then subjecting the treated product to washing, drying and grinding treatment, so as to produce an activated bentonite;
(2) dispersing the activated bentonite in water, then carrying out a first contact with a silane coupling agent to obtain a first mixed solution; subjecting the first mixed solution and chloroform to a miscible process, and performing centrifugation and washing treatment;
(3) dispersing the product obtained from step (2) in water, then subjecting the product to a second contact with one or more selected from the group consisting of N-isopropylacrylamide, methyl methacrylate, ethyl acrylate, benzyl methacrylate, and N,N,N',N'-tetramethylethylenediamine to obtain a second mixed solution; and the second mixed solution and acrylic acid or acrylic ester polymer monomer are subjected to a polymerization addition reaction;

(4) subjecting the product obtained from step (3) to a third contact with the stabilizer to obtain a third mixed solution, and subjecting the third mixed solution to drying, hot rolling and grinding treatment, thereby prepare the thermosensitive self-plugging bentonite.

8. The method of claim 7, wherein, the conditions of miscibility in step (1) comprise: the temperature is within a range of 35-45° C., and the time is 5-8 h;
wherein the conditions of the rotary distillation comprise: the temperature is within a range of 100-120° C., and the time is 5-9 h;
wherein the drying conditions include: the temperature is within a range of 80-90° C., and the time is 2-4 h;
wherein the bentonite is used in an amount of 2-3 g relative to 100 mL of concentrated hydrochloric acid;
wherein the concentrated hydrochloric acid has a concentration of 30%;
wherein the activated bentonite has an average particle size of 300-500 meshes.

9. The method of claim 7, wherein the dispersing conditions in step (2) comprise: the ultrasonic frequency is within a range of 30-35 KHz, the ultrasonic power is 1.5-1.7 w/cm, and the ultrasonic time is 3-5 h;
wherein the conditions of the first contacting include: the temperature is within a range of 50-58° C., and the time is 2-3 h;
wherein the conditions of the centrifugation comprise: centrifuging at 7000-9000 rpm for 3-5 min;
wherein the silane coupling agent is one or more selected from the group consisting of 3-glycidyloxypropyltrimethoxysilane, (3-aminopropyl) trimethoxysilane and gamma-methacryloxypropyltrimethoxysilane;
wherein the activated bentonite is 5-10 g, the silane coupling agent is 1-2 g, and the chloroform is 30-50 mL, relative to 100 mL of water.

10. The method of claim 7, wherein in step (3), the conditions of the second contacting comprise: stirring for 20-30 min under the protection of nitrogen and a condition of ice water bath;
wherein the reaction conditions include: the temperature is within a range of 65-70° C., and the time is 5-8 h;
wherein, the product obtained from step (2) is 3-5 g, the N-isopropylacrylamide is 4-7 g, and the N,N,N',N'-tetramethylethylenediamine is 2-5 g, relative to 200 mL of water;
wherein the volume ratio of the second mixed solution to the acrylic acid and acrylate polymer monomer is 1:(1.15-4.25):(0.2-0.5).

11. The method of claim 7, wherein the conditions of the drying hot rolling in step (4) comprise: the temperature is within a range of 120-130° C., and the time is 24-48 h;
wherein the stabilizer is a mixed solution of anionic carboxymethyl cellulose and polyamide-amine type dendrimer; and the volume ratio of the anionic carboxymethyl cellulose to the polyamide-amine type dendrimer is 1:(2-5);
wherein the stabilizer is 2-5 mL relative to 200 mL of water.

12. The method of claim 7, wherein the thermosensitive self-plugging bentonite has an average particle size of 300-500 mesh.

13. The water-based drilling fluid of claim 1, wherein the water-based drilling fluid further comprises barite powder, the barite powder has an average particle size of 200-500 meshes.

* * * * *